United States Patent
Melchior (10) Patent No.: US 8,002,108 B2
(45) Date of Patent: Aug. 23, 2011

(54) TENSIONING MECHANISM FOR A CIRCULATING ELEMENT

(75) Inventor: Wolfgang Melchior, Hessheim (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 450 days.

(21) Appl. No.: 12/225,299

(22) PCT Filed: Mar. 21, 2007

(86) PCT No.: PCT/EP2007/052668
§ 371 (c)(1),
(2), (4) Date: Sep. 18, 2008

(87) PCT Pub. No.: WO2007/107581
PCT Pub. Date: Sep. 27, 2007

(65) Prior Publication Data
US 2010/0213036 A1    Aug. 26, 2010

(30) Foreign Application Priority Data

Mar. 22, 2006  (DE) .......................... 10 2006 013 635
Dec. 20, 2006  (DE) .......................... 10 2006 060 236

(51) Int. Cl.
*B65G 23/44* (2006.01)
*B65G 23/04* (2006.01)
*F15B 15/26* (2006.01)

(52) U.S. Cl. ..................... 198/813; 198/836.1; 198/841; 198/835; 198/840; 91/41

(58) Field of Classification Search ........................ None
See application file for complete search history.

(56) References Cited

U.S. PATENT DOCUMENTS

| | | | |
|---|---|---|---|
| 2,759,594 A | 8/1956 | Kleboe et al. | |
| 3,444,750 A | 5/1969 | Stuller | |
| 4,605,212 A * | 8/1986 | Kobler | 493/442 |
| 4,606,212 A * | 8/1986 | Sunaga et al. | 72/283 |
| 4,926,999 A * | 5/1990 | Fauth et al. | 198/358 |
| 5,156,260 A * | 10/1992 | Dorner et al. | 198/813 |
| 5,161,376 A * | 11/1992 | Hartmann | 60/562 |
| 5,641,058 A | 6/1997 | Merten et al. | |
| 6,073,755 A | 6/2000 | Hilliard et al. | |
| 6,547,707 B2 | 4/2003 | Cote | |
| 6,659,240 B2 * | 12/2003 | Dernebo | 188/313 |
| 6,695,130 B1 | 2/2004 | Blaylock et al. | |
| 2003/0052445 A1 | 3/2003 | Robert et al. | |

FOREIGN PATENT DOCUMENTS

| | | |
|---|---|---|
| DE | 1 035 046 | 6/1955 |
| DE | 1 080 477 | 6/1958 |
| DE | 1 801 522 | 7/1969 |

(Continued)

*Primary Examiner* — Kavel Singh
(74) *Attorney, Agent, or Firm* — Jones, Tullar & Cooper, P.C.

(57) ABSTRACT

A tensioning apparatus for a circulating element, such as a belt or a band, has a basic body in which a first chamber is formed. A piston is positioned in the first chamber and carries a piston rod. The piston can be displaced in the first chamber by the use of a pressure fluid. Either the piston rod or the base body is attached to the carrier for the belt or band. Either the piston rod or the basic body carries a head piece which can be moved in contact with the circulating element. A locking mechanism for the piston rod can be engaged and disengaged by the use of fluid pressure.

36 Claims, 7 Drawing Sheets

FOREIGN PATENT DOCUMENTS

| | | |
|---|---|---|
| DE | 18 01 522 | 7/1969 |
| DE | 24 47 456 | 5/1975 |
| DE | 25 54 785 | 6/1977 |
| DE | 31 13 894 A1 | 11/1982 |
| DE | 83 17 386 | 11/1983 |
| DE | 34 16 288 A1 | 12/1984 |
| DE | 35 31 552 A1 | 3/1987 |
| DE | 35 40 880 A1 | 3/1987 |
| DE | 38 35 524 A1 | 4/1990 |
| DE | 38 41 884 A1 | 6/1990 |
| DE | 90 05 350.8 | 7/1990 |
| DE | 42 30 781 C2 | 3/1994 |
| DE | 43 15 504 A1 | 11/1994 |
| DE | 44 13 321 A1 | 10/1995 |
| DE | 198 26 334 A1 | 1/1999 |
| DE | 100 14 700 A1 | 10/2001 |
| DE | 101 58 985 A1 | 7/2002 |
| DE | 102 36 018 A1 | 4/2003 |
| EP | 0 890 531 A1 | 1/1999 |
| GB | 1 522 562 | 8/1978 |
| GB | 2 140 759 | 12/1984 |

* cited by examiner

TENSIONING MECHANISM FOR A CIRCULATING ELEMENT

CROSS-REFERENCE TO RELATED APPLICATIONS

This application is the U.S. national phase, under 35 USC 371, of PCT/EP2007/052668, filed Mar. 21, 2007; published as WO 2007/107581 A1 on Sep. 27, 2007 and claiming priority from DE 10 2006 013 635.7, filed Mar. 22, 2006 and from DE 10 2006 060 236.6, filed Dec. 20, 2006, the disclosures of which are expressly incorporated herein by reference.

FIELD OF THE INVENTION

The present invention is directed to tensioning mechanisms for a circulating element. A main body has a first chamber that receives a displaceable piston. A piston rod is driven by movement of the piston in response to the introduction of a pressurized fluid into the first chamber. The main body is mounted on a support and the piston rod supports a head piece, typically a pulley that can be moved into contact with a circulating element.

BACKGROUND OF THE INVENTION

Endless belts, which are utilized as circulating elements, are used in production systems to transport workpieces. For transport of such workpieces in a substantially horizontal direction, the workpieces can lie loosely on an endless belt or can lie loosely on a plurality of endless belts which are arranged side by side. For transport of such workpieces in any direction, they can be clamped between cooperating circulating endless belts that are arranged opposite one another. In either of these configurations, and in order to accurately convey the workpieces, it is important for the endless belts to each have a predetermined degree of tension. Such tension is needed either to limit the sagging of the belts, under the weight of the workpieces, to a predetermined level, or to ensure an adequately secure clamping of the workpieces between the cooperating belts which are arranged opposite one another.

A tensioning mechanism, that can be used to implement a desired tension to a circulating endless belt, generally comprises a main body, which is stationary in relation to a frame that supports the belt, and a head piece, such as a pulley, which is in contact with the belt. The pulley can typically be displaced, in relation to the main body, for the purpose of varying the path length of the belt, thereby varying its tension.

The technique of using a threaded spindle, for the purpose of displacing the pulley, is generally known. The rotation of such a threaded spindle causes the pulley to be displaced in relation to the main body. However, adjusting the belt tension using such a threaded spindle is laborious and time-consuming. Each time the pulley is adjusted, the belt tension must be measured to determine whether it is correct and to thus determine if further displacement of the pulley in one or the other direction is necessary. If a conveyor belt device has a plurality of circulating endless belts which are arranged in parallel, this belt tensioning process must be performed separately for each endless belt. Moreover, in an assembly comprising a plurality of tensioning mechanisms for use in the tensioning of a plurality of belts, it is difficult to transfer the adjusting motion to the threaded spindle of each individual adjustment mechanism within a compact structure.

The tensioning process can be simplified by the use of a tensioning mechanism that is actuated using a pressurized fluid. The pressure of the pressurized fluid applied to the tensioning mechanism determines the belt tension to be achieved rather than a position of the movable pulley. In other words, the application of the same pressure of the pressurized fluid to a tensioning mechanism can result in different positions for the pulley, depending upon the length and the elasticity of the endless belt to be tensioned. The requirement of measuring belt tension is thus eliminated. Moreover, a plurality of tensioning mechanisms, for use with a plurality of belts having the same transport direction, can be acted upon by pressurized fluid in parallel, in order to generate the same belt tension in all of the belts, regardless of potential variations in their lengths and/or elasticity.

However, it has been found that such a pressurized fluid or pneumatically driven belt tensioning mechanism produces greater wear and tear on the endless belts than does a mechanical tensioning mechanism.

DE 35 31 552 A1 discloses a tensionable belt reversal unit for a conveyor belt used in mining and tunnel construction. The tensionable belt reversal unit can be moved and locked in position via an actuator cylinder.

A chain conveyor for underground mining is known from DE 83 17 386 U1. A hoisting cylinder and a locking device are provided.

DE 18 01 522 A describes a tensioning mechanism for endless chain or belt mechanisms. This mechanism is provided with a pressurized medium cylinder.

DE 38 35 524 A1 discloses a reversing station for a scraper chain conveyor. A tensioning mechanism for the scraper chain belt is provided.

DE 25 54 785 A1, DE 100 14 700 A1, DE 43 15 504 A1, DE 42 30 781 C2, DE 35 40 880 A1 and DE 90 05 350 U1 all describe pressure actuated drives.

DE 31 13 894 A1 describes a pressure actuated operating cylinder. A piston rod is steplessly fixed in position via a pressure actuated, stationary device.

EP 0 890 532 A1 relates to a device for tensioning systems for transporting flat products in a folding unit. The device for transporting the flat products includes a plurality of individual belts.

SUMMARY OF THE INVENTION

The object of the present invention is to provide a device that is usable as a tensioning mechanism for a circulating element such as an endless belt.

The object of the present invention is attained with the provision of a tensioning mechanism having a main body in which a first chamber is provided. A piston is positioned in the first chamber and can be displaced by the application of a fluid under pressure to that first chamber. A piston rod is driven by movement of the piston. The main body is securely mounted on a support and the piston rod carries a head piece, such as a pulley that is movable into contact with the circulating element. A mechanism for locking the piston rod in a certain position can be controlled also using pressurized fluid. The main body has at least one second chamber which is usable to control the piston rod locking mechanism.

One advantage of the tensioning mechanism in accordance with the present invention is that it enables a rapid and precise adjustment of belt tension while also enabling a wear-resistant operation of the endless belts. Locking the piston rod in place prevents the pulley from shifting back from its adjusted position as a result of any decrease in belt tension that may occur during operation, for example when a conveyed product is delivered. This would cause the belt to be increasingly stretched over time.

Preferably, at least one second chamber of the main body, which at least one second chamber can also be pressurized with pressurized fluid, is used to control the locking mechanism for the piston rod.

In accordance with one preferred embodiment of the present invention, every second chamber contains a displaceable second chamber piston, which is forced against the piston rod attached to the first chamber piston when the second chamber is pressurized with pressurized fluid. This will lock the piston rod in place.

In accordance with a second preferred embodiment of the present invention, every second chamber can be bounded by a membrane, which membrane is forced against the piston rod that is connected to the first chamber piston when the second chamber is pressurized with pressurized fluid. This second arrangement is also used to lock the piston rod of the first chamber piston in place.

To prevent the piston rod from yielding or deforming under the pressure which is exerted upon it by the second chamber, the piston rod is preferably conducted through an opening in the main body. The second chamber is arranged on one side of the opening. A second side of the opening, which is opposite the first side, is formed by an abutment, which abutment is securely connected to the main body.

To prevent the piston rod from yielding or deforming, it is also expedient for the forces exerted on the piston rod to be provided or exerted by a plurality of second chambers, each pressurized with pressurized fluid. In order to compensate for one another, it is especially beneficial to arrange the plurality of second chambers with the membranes or pistons of the plurality of second chambers executing movements in opposite directions when pressurized, and all exerting forces of substantially the same level on the piston rod.

It is particularly expedient for the piston rod to be divided into a plurality of branches, and for an area of the main body which contains the second chambers to be arranged between these branches. This is beneficial for the application of balanced locking forces to the piston rod by the several secondary chambers.

To ensure adequate rigidity, each of the branches is preferably connected at two ends to a frame that encompasses the respective area of the main body.

To keep the structure compact, the first chamber can also be situated in an area of the main body which is located between the branches.

The piston of the first chamber is preferably a dual action piston. Both an extending movement and a retracting movement of the head piece can be controlled by the use of the dual action piston.

Supply couplings, for use in supplying the first and the second chamber with pressurized fluid are preferably attached, aligned in pairs and in communication with one another, to opposite sides of the main body. This arrangement significantly simplifies the side by side assembly of a plurality of tensioning mechanisms for use in tensioning a plurality of belts in the same conveyor belt device.

To attach the tensioning mechanism to the support, the main body can be equipped with a bore hole. The bore hole can then be configured to hold the support.

This bore hole preferably extends parallel to the direction of alignment of the communicating supply couplings. This will facilitate a compact, organized positioning of the main body and the supply couplings.

The chambers in the main body, and the head piece attached to the piston rod are preferably arranged on diametrically opposite sides of the bore hole. The support can accordingly support the tensioning mechanism close to its center of gravity. At the most, levels of torque will occur between the support and the tensioning mechanism.

BRIEF DESCRIPTION OF THE DRAWINGS

The features and advantages of the present invention are detailed in the following detailed description of the preferred embodiments, taken in conjunction with reference to the accompanying set of drawing figures.

The drawings show in.

DESCRIPTION OF THE PREFERRED EMBODIMENTS

Figure 1:
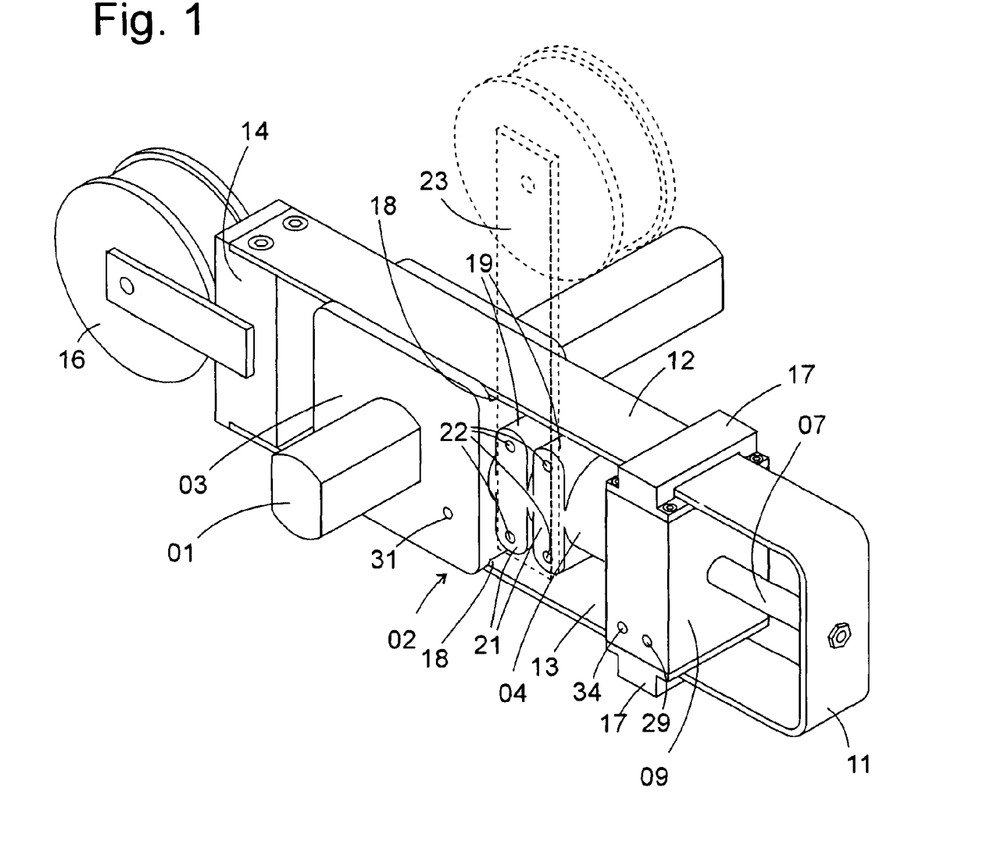
FIG. 1 a perspective view of a tensioning mechanism for a circulating element in accordance with the present invention.
Figure 3:
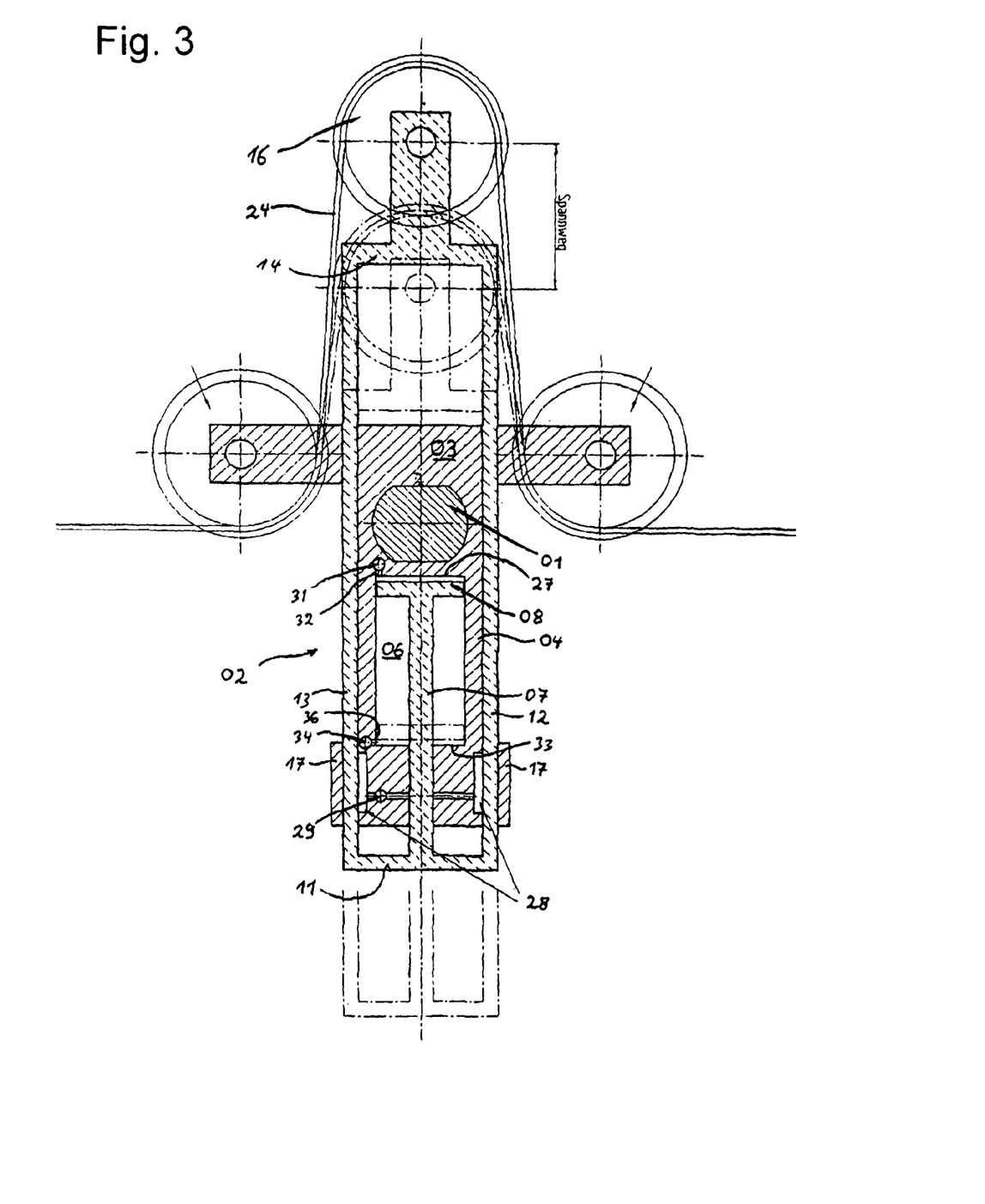
in FIG. 3 a cross-sectional view of the tensioning mechanism in accordance with the present invention.

Referring initially to FIG. 1, there may be seen a preferred embodiment of a tensioning mechanism for a circulating element in accordance with the present invention. The tensioning mechanism which is depicted in FIG. 1 is shown mounted on a rod-shaped support 01, which support 01 is configured having an out-of-round cross-section. An ovoid cross-section is depicted in FIG. 1. It will be understood that other out-of-round cross-sections, such as square, rectangular, elliptical and the like could also be used as the shape for the support 01. A main body 02 of the tensioning mechanism is broken down, in the longitudinal direction of travel of the circulating element, which is not specifically shown in FIG. 1, into a base section 03, a cylindrical section 04, and a head section 09. The support 01 extends through a transverse bore hole in the base section 03. A first chamber 06 is formed in the cylindrical section 04 of the main body 02, as seen in FIG. 3. A piston rod 07 is connected to a piston 08, both of which are disposed in the first chamber 06. The piston rod 07 emerges at the head section 09 of the main body 02. The piston rod 07 is extended by or is joined to a head of a U-shaped yoke 11, which is preferably formed from a metal strip. Two legs 12, 13 of the U-shaped yoke 11 lead back, parallel to the piston rod 07, on opposite sides of the main body 02, to the side of the support 01 which is remote from the head section 09. Each of the legs 12, 13 of the U-shaped yoke is fed through an opening, which is bounded by the head section 09 and by a bracket 17 that is attached to the head section, as seen in FIG. 1. Each leg 12, 13 then extends through a groove or channel 18 which is formed on an upper narrow side, or on a lower narrow side of the base section 03 of the main body 02. At their open ends, the two legs 12, 13 of the U-shaped yoke 11 are securely connected, to form a rigid, rectangular frame, via a block 14. The block 14, in turn, supports a head piece in the form of a rotatable pulley 16, which pulley 16 is configured to be wrapped by an endless belt whose tension is to be adjusted. The piston rod 07, the yoke 11 and the block 14 can together be conceived of, in a broader sense, as a compound piston rod which connects the pulley 16 to the piston 08, in order to accomplish an adjusting movement of the pulley 16.

Two pairs of ribs 19, as may also be seen in FIG. 1, and which are adjacent the main body base section 03, have end surfaces 21 that lie within the same plane. That rib end surface plane is perpendicular to the longitudinal direction of the support 01. These ribs 19 are formed on the cylindrical section 04 of the main body 02. Threaded bore holes 22 are formed in the end surfaces 21 and are situated to enable the attachment of an arm 23 that supports one or more additional pulleys. One such attachment arm 23 and its additional pulley is illustrated in FIG. 1 by a dashed line because it is optional.

The diameter of the piston 16 is preferably from 25 mm to 40 mm, and preferably is 32 mm. With this pulley 16, belts that are 25 mm to 35 mm in width, and which preferably are 30 mm in width, can be tensioned.

Figure 2A:
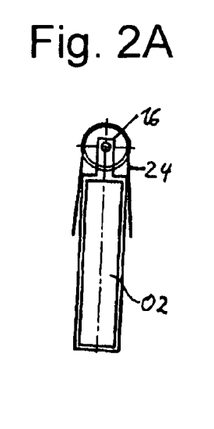
in FIG. 2A-D schematic representations of variations of the tensioning mechanism.
Figure 2B:
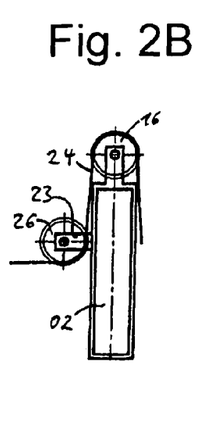
Figure 2C:
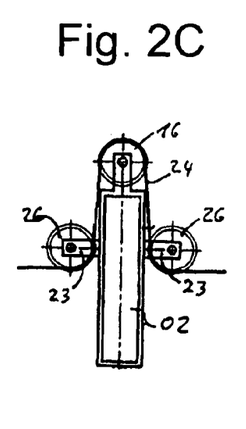
Figure 2D:
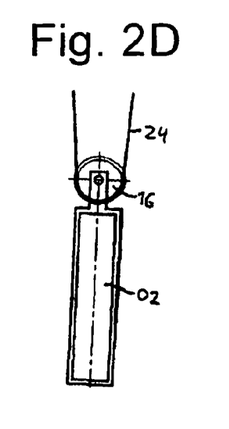

As is illustrated schematically in FIG. 2A, the tensioning mechanism, in accordance with the present invention, can use the pulley 16 as the sole pulley, and can tension a belt 24, which wraps around the pulley 16 on a section of its periphery that faces away from the main body. Such tensioning of belt 24 is accomplished by pushing the pulley 16 away from the main body 02. The aforementioned optional arm 23 can be equipped with an additional pulley 26, around which additional pulley 26 the belt 24 is wrapped, as seen in FIG. 2B. The arm or arms 23 can project outward from the main body 02 in opposite directions, and can support a pulley 26 at each open end, as seen in FIG. 2C. Moreover, an arrangement, in accordance with FIG. 2D is also possible in which only the displaceable pulley 16 is provided, but it is wrapped by the belt 24 to be tensioned on its side that faces the main body 02.

FIG. 3 shows a detailed sectional view of the tensioning mechanism, in accordance with the present invention, in the arrangement depicted schematically in FIG. 2C. A first stop configuration, in which the pulley 16 is spaced as far as possible from the main body 02, is represented by solid lines. In this first stop configuration, the piston 08 is located in the first chamber 06 in direct proximity to a first chamber end surface 27 of the chamber 06, which is adjacent to the support 01. The piston rod 07 extends through the chamber 06 and through a bore hole in the head section 09, up to a point of connection with the yoke 11, which lies outside of the main body 02. The two legs 12, 13 of the yoke extend parallel to the piston rod 07 in the opposite direction between the head section 09 and the brackets 17 which are attached to the head section 09, as seen in FIG. 1. In the head section 09, opposite the brackets 17, two locking chambers 28 can be seen in FIG. 2, which locking chambers 28 can be pressurized with compressed air via a bore hole 29 that extends through the head section 09 parallel to the support 01. Each of the locking chambers 28 contains a membrane or a piston plate, not specifically seen, which membrane or piston plate, when the locking chambers 28 are pressurized with compressed air, force the legs 12, 13 against the brackets 17, thereby fixing them in their position. When the locking chambers 28 are in the pressureless state, the legs 12, 13 are freely displaceable with respect to the brackets 17.

Figure 4:
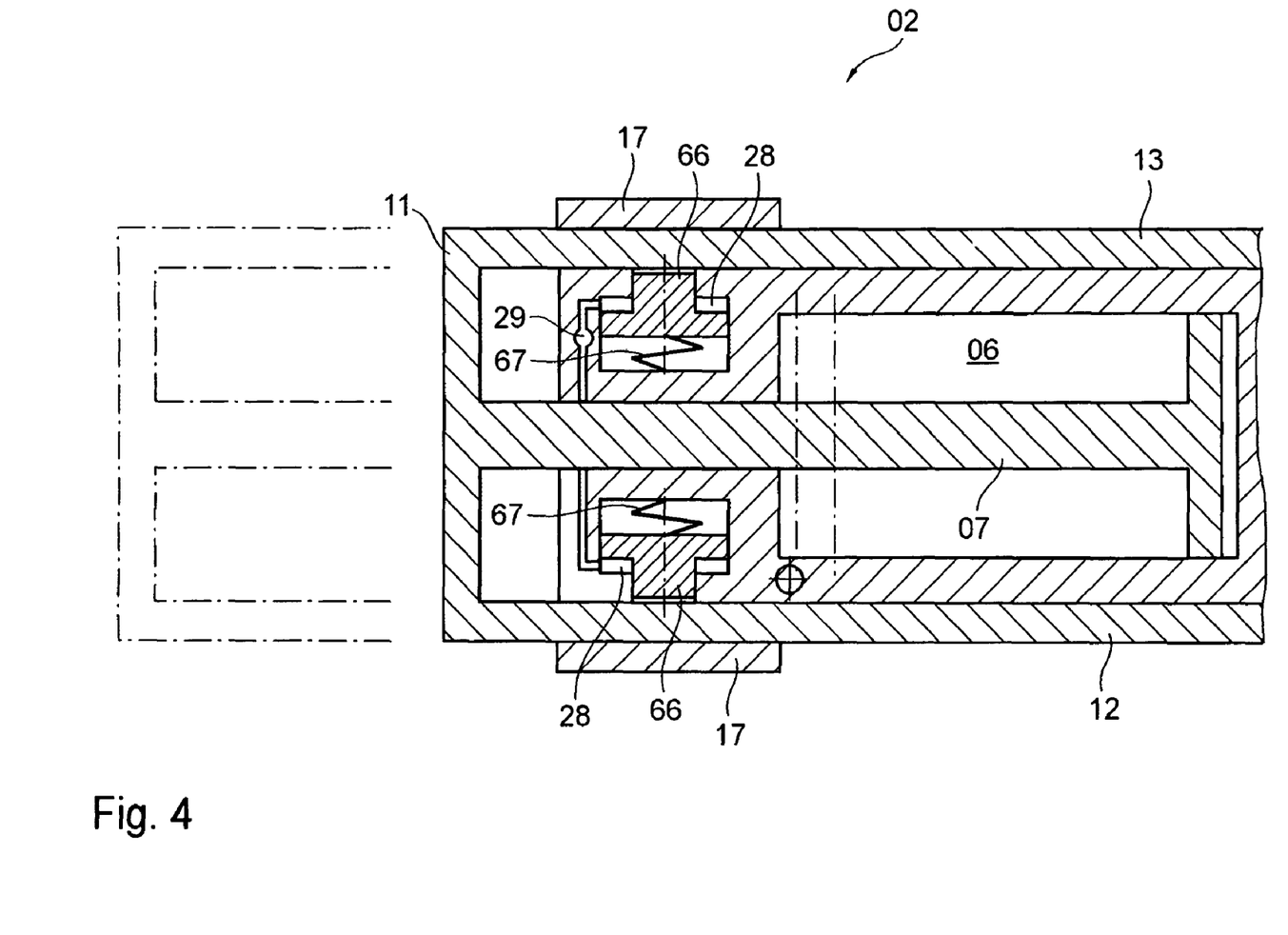
in FIG. 4 a locking device for the tensioning mechanism.

In another embodiment of the present invention, depicted for example according to FIG. 4, clamping pads 66 are arranged in the locking chambers 28. These clamping pads 66 force the legs 12, 13 of the yoke 11 against the brackets 17 in response to forces exerted on them by compression springs 67. When the locking chambers 28 are pressurized with pressure medium, the clamping pads 28 are retracted against the force of springs 67, and therefore the locking mechanisms, are released. To lock the individual tension pulley 16 in position, a spring-loaded clamping pad 66, with a finely toothed radial outer surface is used, which spring-loaded clamping pad 66 prevents movement of the U-shaped yoke 11, whose legs 12 and 13 may also each have a finely toothed surface, for example, via mating engagement with the clamping pads 66. To enable an adjustment of a tensioning of the tension pulley, the spring pressure on the clamping pad 66 is pneumatically released. When the pneumatic pressurization is removed, and the spring pressure is re-established the form-closure locking again takes effect, and the tension pulley 16 is now fixed in a new position.

Figure 5:
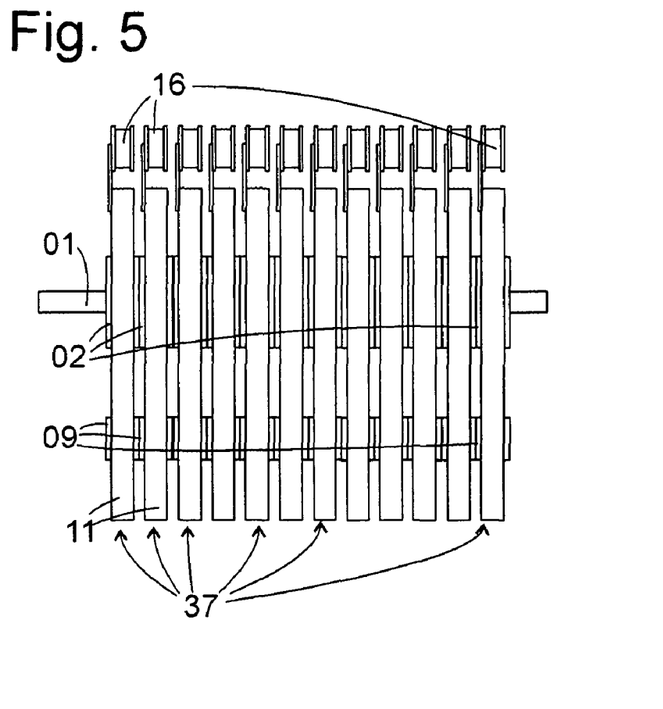
in FIG. 5 an arrangement of a plurality of tensioning mechanisms combined to form an assembly.
Figure 6:
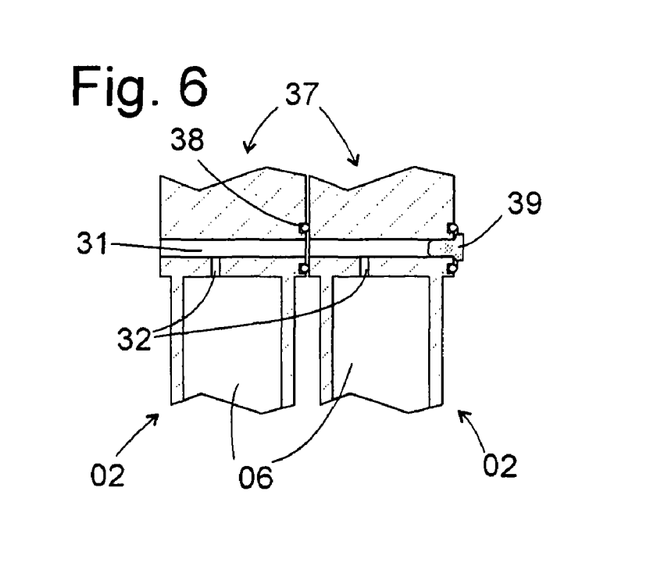
in FIG. 6 an enlarged partial sectional view of tensioning mechanisms combined to form an assembly.

In another preferred embodiment of the present invention, when the locking chambers 28 are in the unpressurized state, a residual holding force may be provided by frictional resistance. This frictional residual holding force remains, in particular, even when the tensioning mechanisms 37, which are shown in FIGS. 5 and 6, are in an unfavorable assembling position. In this case, each pulley 16 maintains its position, causing the belts 24 to also remain on track when the pressure medium is shut off.

A second bore hole 31, which is parallel to the support 01, extends through the base section 03, as may be seen in FIGS. 1 and 3. It communicates with the first chamber 06 via a radial bore hole 32, which is seen in FIG. 3 and which opens up, or passes into the first chamber end surface 27 of the chamber 06. If the locking chambers 28 are pressureless and the bore hole 31 is pressurized with compressed air, the compressed air flowing through the bore hole 31 into the chamber 06 forces the piston 08 out of the stopped position, as represented by continuous lines in FIG. 3, and into an opposite stopped position, which is represented by dotted-dashed lines in FIG. 3, in which the piston 08 is situated in direct proximity to the opposite second end surface 33 of the chamber 06.

A third bore hole 34 is formed in the head section 09 and communicates with the chamber 06 via a radial bore hole 36 that opens up adjacent to the second chamber end surface 33. By pressurizing the third bore hole 34, while simultaneously releasing the pressure on the second bore hole 31, the piston 08 can be forced back into the tensioning configuration, which is represented by the continuous lines in FIG. 3.

When the belt 24 is wrapped around the pulley 16, as shown in FIG. 3, the tension of the belt 24 can prevent the piston from returning to the fully extended configuration, which is represented by continuous lines in FIG. 3. Instead, the piston 24 now comes to rest in an intermediate position, which is not specifically shown, in which intermediate position, the pressure acting on the piston 08 and the tensioning of the belt 24 compensate for one another.

This invention enables the easy and rapid adjustment of a plurality of tensioning mechanisms 37, which are mounted side by side on the same support 01, as shown in FIG. 5, for example. All of the tensioning mechanisms 37 are acted upon by an equal level of pressure at each one of their respective third bore hole 34, or at their second bore hole 31, if the belt 24 is arranged as shown in FIG. 2D. The adjusting movement of each pulley 16, that is executed as a result of the pressurization, can differ from one tensioning mechanism 37 to another. However, the generated belt tension is the same for all tensioning mechanisms 37. After the belt tension has been adjusted, the bore hole 29 is pressurized in order to lock the tensioning mechanisms 37 of the configuration depicted in FIG. 3 in the adjusted configuration. Alternatively, the bore holes 29 of FIG. 4 can be depressurized thereby locking each respective tensioning mechanism in its locked position under the force applied to each clamping pad by its associated spring 67. The first chamber 06 can then be left pressureless until the next adjustment process.

The adjusting movement range, of, for example, 55 mm to 65 mm, of a single tensioning mechanism 37 is preferably greater than a radius, and especially is greater than a diameter, of the pulley 16.

As is shown, for example, in FIG. 5, the tensioning mechanisms 37 are positioned on the support 01 closely enough in adjacency to each other that the base sections 03 and head sections 09 of their respective main bodies are in mutual contact with one another. To pressurize homologous bore holes 29, 31 or 34 of the individual tensioning mechanisms 37 simultaneously with compressed gas, it is sufficient, as shown in the partial cross-sectional view of FIG. 6, by the example of the bore holes 31, to provide a groove, situated on one side of each main body 02 and encompassing the respective bore hole 31, which groove is equipped with a sealing ring 38. Each sealing ring 38 between adjacent ones of the main bodies 02 of the tensioning mechanisms 37 is compressed when the tensioning mechanisms 37 are assembled. A stopper 39 is positioned at one end of the assembled bore holes 31 which are aligned with one another, with stopper 39 being located in the far end of the last bore 31, which is facing away from the compressed gas source. Thus, a single compressed gas source, combined with a directional valve or with two shut-off valves, is sufficient for adjusting the plurality of adjoining tensioning mechanisms 37 and for fixing them in their adjusted configuration.

The tensioning mechanism can be used for tensioning circulating endless belts 24 for any of a wide variety of applications. The support 01 is generally attached to the same frame on which guide rollers that guide the endless belts 24 are mounted. The tensioning mechanism of the present invention permits the endless belts 24 to be adjusted either at rest or in motion. One preferred area of application of the present invention is for use with endless belts which are used to transport printed products to be folded in a generally known folding unit 41, as is depicted in FIG. 8.

Figure 7:
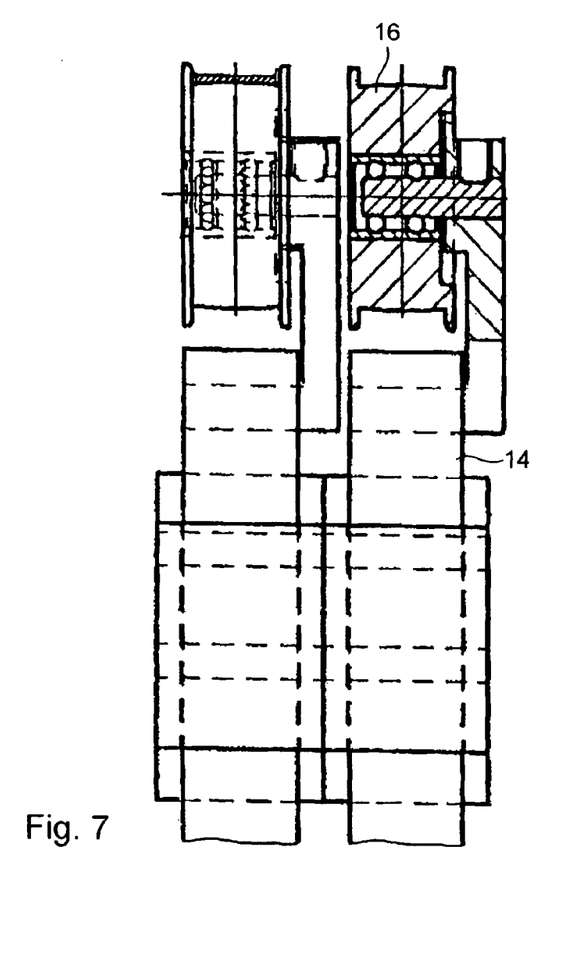
in FIG. 7 an enlarged partial sectional view of a head piece of the tensioning mechanism in accordance with the present invention.

FIG. 7 shows a pulley 16, which is arranged on the block 14 by the use of roller bearings. The pulley 16 can have different widths, such as 6.5 mm, 9 mm, 18 mm, 20 mm or 22 mm and can also have shapes for its belt-engaging bearing surfaces, such as flat or convex.

Figure 8:
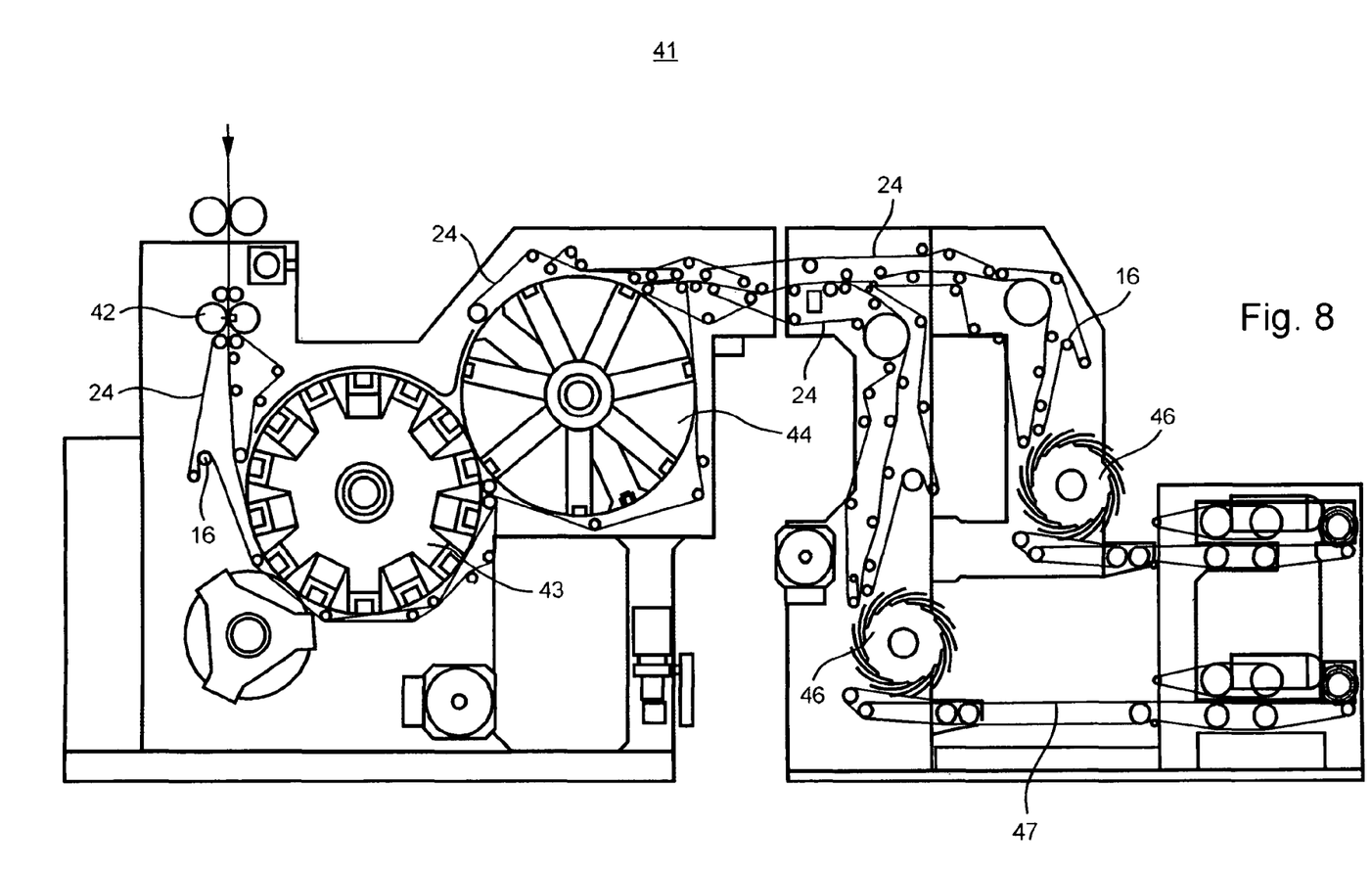
in FIG. 8 a schematic representation of a folding unit with belt systems; and in FIG. 9 a schematic representation of a belt tensioning system.

FIG. 8 shows, by way of example, a folding unit 41 with corresponding belts 24. A cross-cutting device 42 is positioned upstream, in the path of travel of a paper web, in the folding unit 41, and is used to cross-cut a printed paper web, for example, into product sections, before the printed web is taken up onto the surface of a transport or folding blade cylinder 43, where it is held by pins or grippers, for example, is then cross-folded in the gap by a folding jaw cylinder 44, and is taken over by the folding jaw cylinder 44. Between the cross-cutting device 42 and the folding blade cylinder 43, a belt 24, which is configured as an accelerating belt, can be provided for use in guiding the product sections. Downstream from the folding jaw cylinder 44, the now folded product is taken over, for example, by a belt system which may be comprised of at least one belt 24, and is conveyed, for example, to one or more delivery fans 46 or to another optional unit of a folding unit, such as for formation of a second longitudinal fold and/or a second cross fold, which is not specifically shown here. The belt system, which is situated downstream from the folding jaw cylinder 44, is configured, for example, as a dual system comprising two belts 24, between which the product sections are conveyed. A delivery belt 47, for example, is situated downstream from the delivery fan 46. In FIG. 8, in the belt system which is situated upstream from the folding blade cylinder 43, and in a belt system which is situated downstream from the folding jaw cylinder 44, a corresponding tensioning mechanism, in accordance with the present invention, is indicated, by way of example, by a pulley 16. One or more tensioning mechanisms in accordance with the present invention can be provided in each belt system.

Figure 9:
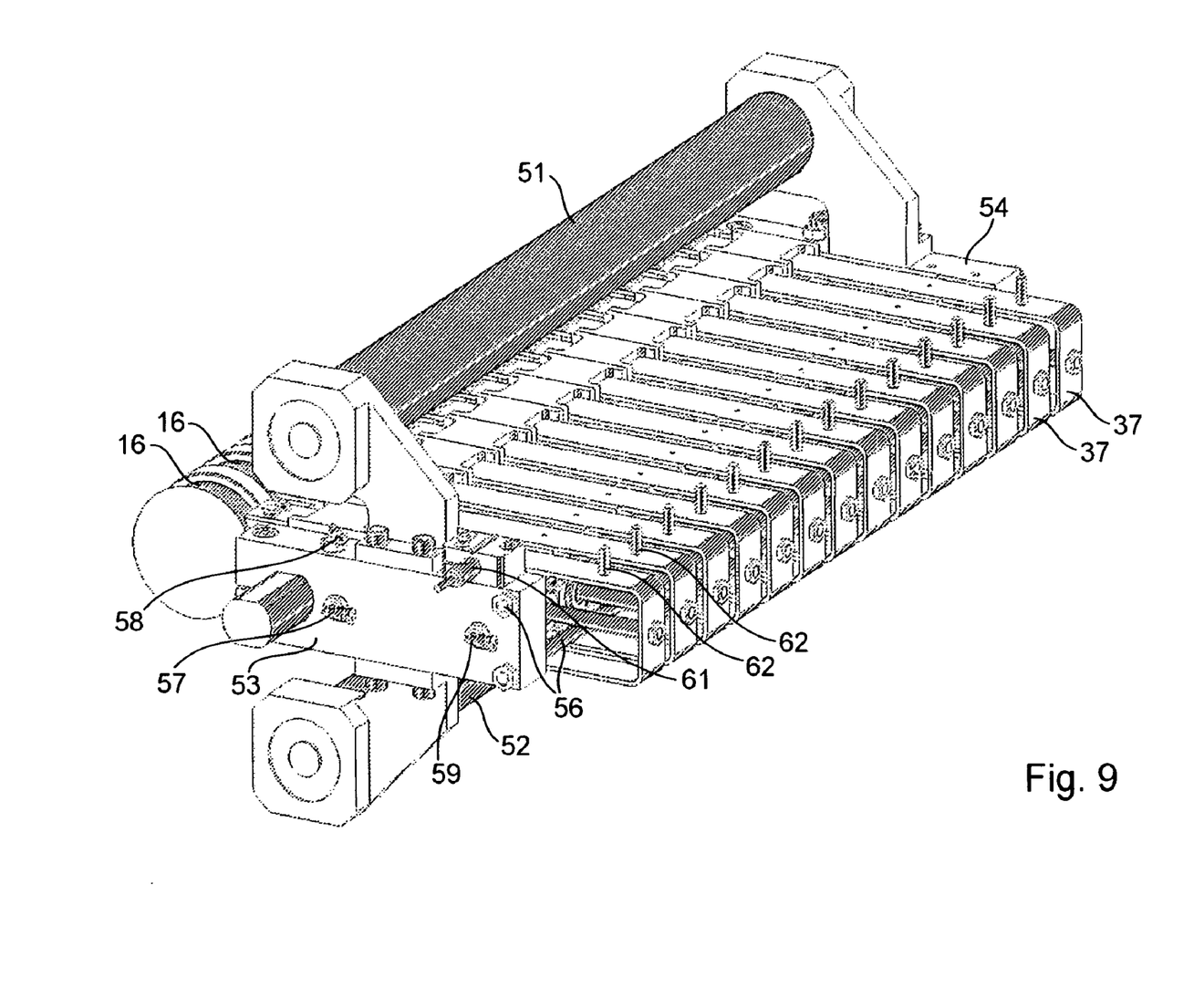

In a further preferred embodiment of the present invention, in place of the single pulley 16 for use in the diversion of the plurality of belts 24, a continuous guide roller 51 may be provided, which continuous guide roller 51 is extending crosswise to the direction of travel of the conveyor belts, as depicted in FIG. 9. At least one such shared guide roller 51 is provided for a plurality of tensioning mechanisms 37. In the preferred embodiment, which is shown in FIG. 9, a first guide roller 51 and a second guide roller 52 are provided for all of the tensioning mechanisms 37.

The tensioning mechanisms 37 are all arranged on a single support 01 and are all fixed in place by first and second end plates 53; 54 which end plates 53; 54 are situated at each end in the longitudinal direction of the support 01, as seen in FIG. 9. The two end plates 53; 54 are secured to each other by the use of tie rods, for example. The two end plates 53; 54 can also support screw-connected bearings, for example, and especially can support roller bearings, which are configured to hold the respective ends of the guide rollers 51; 52.

At least one of the first and second end plates 53; 54 is connected to at least one coupling 57; 58 for use in supplying the pressurized fluid that is required for the tensioning and/or the slackening of the endless belt 24, via the piston 08 and/or with a coupling 59 for use in locking the endless belt 24 or the piston 08 in position.

In one advantageous preferred embodiment of the present invention, for example, a sensor 61 may be arranged on at least one of the first and second end plates 53; 54. This sensor 61 is usable to detect the position of at least one tensioning mechanism 37, and especially is usable to detect the position of a part of the tensioning mechanism 37 that cooperates with the pulley 16, preferably the yoke 11.

In addition, a reference element 62, such as, for example, a pin 62 is arranged on each tensioning mechanism 37 and is capable of moving together with the respective pulley 16 of each tensioning mechanism 37. The reference element 62 can also be arranged inside the U-shaped yoke 11. The sensor 61, which is embodied, for example, as a photodiode, detects the position of the pulley 16 and thus signals an end of the tensioning path and/or wear and tear on the endless belts 24.

While preferred embodiments of a tensioning mechanism for a circulating element, in accordance with the present invention, have been set forth fully and completely hereinabove, it will be apparent to one of skill in the art the various changes in, for example, the source of the fluid under pressure, the specific types of printing presses used to print the web, and the like could be made without departing from the true spirit and scope of the present invention which accordingly is to be limited only by the appended claims.

What is claimed is:

1. A tensioning mechanism for a circulating element, comprising:
   a main body;
   a first chamber is formed in the main body;
   a piston in the first chamber, which piston can be displaced within the first chamber by a pressurized fluid;
   a piston rod connected to, and driven by the piston;

a support, the main body being securely mounted on the support;

a head piece secured to the piston rod and which can be moved by the piston rod into contact with the circulating element;

a lock mechanism in the main body and separate from the first chamber in which the piston is displaceable, the lock mechanism being usable to lock the piston rod in a selected position, which lock mechanism is controllable using pressurized fluid;

at least one second chamber, in the main body and separate from the first chamber in which the piston is displaceable, the lock mechanism being positioned in the second chamber which is pressurizable with the pressurized fluid to control the lock mechanism for releasably locking the piston rod in a selected position;

an opening, in the main body and through which the piston rod passes, wherein the second chamber is arranged on a first side of the opening; and an abutment which is securely attached to the main body, a second side of the opening, which is opposite the first side of the opening, is being formed by the abutment.

2. A tensioning mechanism for circulating element, comprising:

a main body;

a first chamber formed in the main body;

a piston in the first chamber, which piston can be displaced within the first chamber by a pressurized fluid, a piston rod connected to, and driven by the piston;

a support, the main body being securely mounted on the support;

a head piece secured to the piston rod and which can be moved in by the piston rod into contact with the circulating element;

a lock mechanism in the main body and separate from the first chamber in which the piston is displaceable, the lock mechanism being useable to lock the piston rod in a selected position, which lock mechanism is controllable using pressurized fluid;

at least one second chamber, in the main body and separate from the first chamber in which the piston is displaceable, the lock mechanism being positioned in the second chamber which is pressurizable with the pressurized fluid to control the lock mechanism for releasably locking the piston rod in a selected position; and at least one sensor, the at least one sensor being arranged to at least one of directly and indirectly detect the position of at least the piston rod supported by the main body.

3. The tensioning mechanism according to claim 1, characterized in that the at least one second chamber is pressurized with pressurized fluid to lock the piston rod in position.

4. The tensioning mechanism according to claim 1, characterized in that the at least one second chamber is void of the pressurized fluid to release the mechanism for locking the piston rod in position.

5. The tensioning mechanism according to claim 1, characterized in the that the at least one second chamber contains one of a displaceable piston and a clamping pad.

6. The tensioning mechanism according to claim 5, characterized in that, when the at least one second chamber is pressurized with pressurized fluid, the displaceable piston is forced against the piston rod.

7. The tensioning mechanism according to claim 5, characterized in that a compression spring is arranged in the at least one second chamber to force the clamping pad against the piston rod to lock the piston rod in position.

8. The tensioning mechanism according to claim 1, characterized in that the at least one second chamber is bounded by a membrane, which membrane when the at least one second chamber is pressurized with the pressurized is forced against the piston rod.

9. The tensioning mechanism according to claim 2, characterized in that the piston rod is guided through an opening in the main body and through which the piston rod passes, wherein the second chamber is arranged on a first side of the opening, and further including an abutment, which is securely attached to the main body, a second side of the opening, which is opposite the first side, of the opening being formed by the abutment.

10. The tensioning mechanism according to claim 1, further including a plurality of said second chambers and wherein the forces exerted on the piston rod by the plurality of second chambers pressurized with the pressurized fluid compensate for one another.

11. The tensioning mechanism according to claim 1, characterized in that the piston rod is divided into a plurality of piston rod branches and wherein an area of the main body which contains the second chambers is arranged between spaced ones of the piston rod branches.

12. The tensioning mechanism according to claim 11, characterized in that each of the spaces ones of the piston rod branches is connected at two ends to a frame, which encompasses the area of the main body arranged between the space ones of the piston rod branches.

13. The tensioning mechanism according to claim 11, characterized in that the first chamber is also situated in the area of the main body that is arranged between the spaced ones of the piston rod branches.

14. The tensioning mechanism according to claim 1, characterized in that the piston in the first chamber a dual action piston.

15. The tensioning mechanism according to claim 1, further including supply couplings, which are usable for supplying the first and second chambers with the pressurized fluid, are positioned, aligned in pairs, and communicating with one another on opposite sides of the main body.

16. The tensioning mechanism according to claim 1, characterized in that the main body has a bore hole which is configured to hold the support.

17. The tensioning mechanism to claim 16, characterized in that a direction of alignment of the communicating supply couplings is parallel to the bore hole.

18. The tensioning mechanism according to claim 16, characterized in that the first and second chamber and the head piece are arranged on opposite side of the bore hold.

19. The tensioning mechanism according to claim 1, characterized in that the circulating element is a belt.

20. The tensioning mechanism according to claim 19, characterized in that the belt is in a folding unit of a printing press.

21. The tensioning mechanism according to claim 20, characterized in that the tensioning mechanism cooperates with a belt of a belt system that is situated upstream, in a direction of material travel, of folding blade cylinder.

22. The tensioning mechanism according to claim 20, characterized in that the tensioning mechanism cooperates with a belt of a belt system that is situated downstream; in a direction of material travel, of a folding jaw cylinder.

23. The tensioning mechanism according to claim 1, characterized in that the piston rod can be steplessly locked in position by the lock mechanism.

24. The tensioning mechanism according to claim 1, characterized in that the at least one second chamber is adapted to be pressurized with the pressurized fluid independently of the first chamber.

25. The tensioning mechanism according to claim 1, characterized in that in one operating state of the tensioning mechanism the first chamber is pressurized with pressure medium and the second chamber is pressureless.

26. The tensioning mechanism according to claim 1, further including at least one shared guide roller for a plurality of piston rods.

27. The tensioning mechanism according to claim 26, characterized in that one shared guide roller is provided for all of the plurality of piston rods.

28. The tensioning mechanism according to claim 26, characterized in that two shared guide rollers are provided for the plurality of piston rods.

29. The tensioning mechanism according to claim 1, characterized in that at least one sensor is arranged to one of directly and indirectly detect the position of the piston rod supported by the main body.

30. The tensioning according to claim 1, characterized in that a plurality of the tensioning mechanisms are arranged side by side.

31. The tensioning mechanism according to claim 1, characterized in that a plurality of tensioning mechanisms are held by two end plates.

32. The tensioning mechanism according to claim 31, characterized in that at least one end plate has a coupling that is usable for supplying the pressure medium.

33. The tensioning mechanism according to claim 31, characterized in that at least one end plate has a sensor for detecting the position of the piston rod supported by the main body.

34. The tensioning mechanism according to claim 1, characterized in that the tensioning mechanism has a reference element that can be moved along with the piston rod supported by the main body.

35. The tensioning mechanism according to claim 29, characterized in that a sensor is provided for detecting the position of all tensioning mechanisms.

36. The tensioning mechanisms according to claim 1, characterized in that head piece is configured as a pulley which is secured to the piston rod remote from the main body and which pulley is engageable with the circulating element.

* * * * *

UNITED STATES PATENT AND TRADEMARK OFFICE
CERTIFICATE OF CORRECTION

| | | |
|---|---|---|
| PATENT NO. | : 8,002,108 B2 | Page 1 of 1 |
| APPLICATION NO. | : 12/225299 | |
| DATED | : August 23, 2011 | |
| INVENTOR(S) | : Melchior | |

It is certified that error appears in the above-identified patent and that said Letters Patent is hereby corrected as shown below:

In the Claims:

Column 8, claim 1, line 64, after "chamber", delete "is".

Column 9, claim 1, line 23, after "opening", delete "is".

Column 10, claim 8, line 3, after "membrane", insert a --,--; and line 4, after "pressurized" (second occurrence), insert --fluids--.

Column 10, claim 12, line 26, after "the" (first occurrence), change "spaces" to --spaced--; and line 28, after "the" (third occurrence), change "space" to --spaced--.

Column 10, claim 14, line 35, after "chamber", insert --is--.

Column 10, claim 18, line 50, after "second", change "chamber" to --chambers--; and line 51, after "bore", change "hold" to --hole--.

Column 10, claim 22, line 63, after "downstream", change the ";" to a --,--.

Column 11, claim 25, line 7, after "mechanism", insert a --,--.

Column 12, claim 36, line 18, after "that", insert --the--.

Signed and Sealed this
Seventeenth Day of January, 2012

David J. Kappos
*Director of the United States Patent and Trademark Office*